United States Patent
Ji et al.

(10) Patent No.: US 9,923,612 B2
(45) Date of Patent: Mar. 20, 2018

(54) METHOD AND DEVICE FOR TRANSMITTING CHANNEL STATE INFORMATION REFERENCE SIGNAL, HYBRID SPATIAL DIVISION MULTIPLEXING, AND SPACE DIVISION MULTIPLE ACCESS IN WIRELESS COMMUNICATION SYSTEM USING TWO-DIMENSIONAL PLANAR ARRAY ANTENNA

(71) Applicants: Samsung Electronics Co., Ltd., Gyeonggi-do (KR); Korea National University of Transportation Industry Academic Cooperation Foundation, Chungcheongbuk-do (KR)

(72) Inventors: Hyoungju Ji, Seoul (KR); Cheol Mun, Gyeonggi-do (KR); Younsun Kim, Gyeonggi-do (KR); Juho Lee, Gyeonggi-do (KR); Hyojin Lee, Gyeonggi-do (KR); Joonyoung Cho, Gyeonggi-do (KR)

(73) Assignees: Samsung Electronics Co., Ltd. (KR); Korea National University of Transportation Industry Academic Cooperation Foundation (KR)

( * ) Notice: Subject to any disclaimer, the term of this patent is extended or adjusted under 35 U.S.C. 154(b) by 132 days.

(21) Appl. No.: 14/762,159

(22) PCT Filed: Jan. 15, 2014

(86) PCT No.: PCT/KR2014/000421
§ 371 (c)(1),
(2) Date: Jul. 20, 2015

(87) PCT Pub. No.: WO2014/112779
PCT Pub. Date: Jul. 24, 2014

(65) Prior Publication Data
US 2015/0373736 A1    Dec. 24, 2015

(30) Foreign Application Priority Data

Jan. 18, 2013   (KR) .................. 10-2013-0005810

(51) Int. Cl.
*H04B 7/0413*  (2017.01)
*H04B 7/26*  (2006.01)
(Continued)

(52) U.S. Cl.
CPC ......... *H04B 7/0413* (2013.01); *H04B 7/0697* (2013.01); *H04B 7/2621* (2013.01); *H04L 5/0048* (2013.01); *H04W 72/1273* (2013.01)

(58) Field of Classification Search
CPC .. H04B 7/0452; H04B 7/0456; H04B 7/0626; H04B 7/0632; H04B 7/0639;
(Continued)

(56) References Cited

U.S. PATENT DOCUMENTS 6,738,020 B1 *  5/2004  Lindskog ............. H01Q 3/2605
                                                        342/175
7,848,445 B2 * 12/2010  She ........................ H04L 1/0631
                                                        375/260

(Continued)

FOREIGN PATENT DOCUMENTS

| EP | 2448139 | 5/2012 |
| KR | 100750820 | 8/2007 |

OTHER PUBLICATIONS

PCT/ISA/237 Written Opinion issued on PCT/KR2014/000421 (pp. 5).

(Continued)

*Primary Examiner* — Anh-Vu Ly
*Assistant Examiner* — Roberta A Shand
(74) *Attorney, Agent, or Firm* — The Farrell Law Firm, P.C.

(57) ABSTRACT

The present invention proposes a hybrid spatial multiplexing (SM) and a space division multiple access (SDMA) tech- (Continued)

nique in a frequency division duplex (FDD) massive multiple-input multiple output (MIMO) system using a two-dimensional planar array antenna, which effectively transmits a channel state information reference signal (CSI-RS) for estimating a downlink two-dimensional space channel using only a limited amount of downlink radio resources, and optimally selects and performs the SM and SDMA techniques in a two-dimensional space channel. To this end, the present invention proposes a technique which defines space resource blocks (SRB) by grouping space elements (SE) having a high spatial correlation between downlink channels in the horizontal dimension and corresponding SEs thereof in the vertical dimension, and transmits CSI-RSs for estimating channels in vertical dimension SEs corresponding to one selected horizontal SE in each SRB every transmit time interval (TTI). The present invention proposes a technique wherein user equipment (UE) estimates the spatial correlation between channels of different horizontal dimension SEs belonging to the same SRB received in different TTIs and the spatial correlation between channels of horizontal dimension SEs belonging to different SRBs received in the same TTI, and feeds information for changing the size of SRB of the corresponding UE to an optimal size back to eNodeB. The present invention proposes a technique wherein the UE estimates downlink channels through CSI-RSs transmitted from each SRB, and each UE feeds an index of a preferred SRB, a rank of the corresponding SRB in the vertical dimension, and channel quality information (CQI) back to eNodeB. When each UE determines the rank, it is possible to transmit the ranks to the fullest extent in the vertical dimension and only a single rank from each SRB in the horizontal dimension.

24 Claims, 5 Drawing Sheets (51) Int. Cl.
  *H04B 7/06* (2006.01)
  *H04L 5/00* (2006.01)
  *H04W 72/12* (2009.01)

(58) Field of Classification Search
  CPC ...... H04B 7/0417; H04B 7/04; H04B 7/0413; H04B 7/0486; H04L 1/06; H04L 7/0618; H04W 24/10; H04W 24/107
  See application file for complete search history.

(56) References Cited

U.S. PATENT DOCUMENTS

| | | | |
|---|---|---|---|
| 2008/0232325 A1* | 9/2008 | Mehta | H04B 7/061 370/332 |
| 2008/0317145 A1* | 12/2008 | Clerckx | H04B 7/043 375/260 |
| 2010/0189055 A1 | 7/2010 | Ylitalo | |
| 2011/0064043 A1* | 3/2011 | Balachandran | H04L 5/0037 370/330 |
| 2011/0249613 A1 | 10/2011 | Sun et al. | |
| 2012/0108254 A1 | 5/2012 | Kwon et al. | |
| 2012/0133557 A1 | 5/2012 | Beaudin | |
| 2013/0107861 A1* | 5/2013 | Cheng | H04W 72/042 370/331 |
| 2013/0182789 A1* | 7/2013 | Ko | H04B 7/0626 375/267 |
| 2014/0079100 A1* | 3/2014 | Kim | H04B 7/0417 375/219 |
| 2014/0098689 A1* | 4/2014 | Lee | H04B 7/0469 370/252 |
| 2014/0187283 A1* | 7/2014 | Nimbalker | H04W 72/048 455/550.1 |
| 2015/0092875 A1* | 4/2015 | Kim | H04B 7/0478 375/267 |
| 2015/0223149 A1* | 8/2015 | Liu | H04W 48/12 370/252 |

OTHER PUBLICATIONS

PCT/ISA/210 Search Report issued on PCT/KR2014/000421 (pp. 3).

Ng, Boon Loong et al., Fulfilling the Promise of Massive MIMO with 2D Active Antenna Array, Globecom Workshops, 2012 IEEE, Dec. 3-7, 2012 (pp. 8).

* cited by examiner

METHOD AND DEVICE FOR TRANSMITTING CHANNEL STATE INFORMATION REFERENCE SIGNAL, HYBRID SPATIAL DIVISION MULTIPLEXING, AND SPACE DIVISION MULTIPLE ACCESS IN WIRELESS COMMUNICATION SYSTEM USING TWO-DIMENSIONAL PLANAR ARRAY ANTENNA

TECHNICAL FIELD

The present invention relates to a wireless communication system, and more particularly, to a device and a method for transmitting and receiving data, which effectively transmits a Channel State Information Reference Signal (CSI-RS) for estimating a downlink two-dimensional space channel, by using only a limited amount of downlink radio resources, in a Frequency Division Duplex (FDD) massive Multiple-Input Multiple-Output (MIMO) system using a two-dimensional planar array antenna In addition, the present invention relates to a device and a method for a hybrid Spatial Multiplexing (SM) & Space Division Multiple Access (SDMA) which optimally selects and performs SM and SDMA techniques in a two-dimensional space channel.

BACKGROUND ART

Research on a massive MIMO technique wherein data is transmitted to a plurality of User Equipments (UEs) using a MIMO (i.e., a multi-user MIMO) technique is progressing as a core communication technique in a next generation wireless communication system. Theoretically, since a transmission beamforming gain is proportional to the number of transmission antennas, when a high beamforming gain of a massive MIMO system is used, each transmission antenna comes to the forefront as an important technique of green communication because each transmission antenna uses low transmission power.

As a cell of a mobile communication system becomes smaller and the number of transmission antennas of an eNodeB increases, a capacity gain by a beamforming, an SM and an SDMA in a vertical dimension in addition to the existing horizontal plane (i.e., a horizontal dimension) is expected. Therefore, a necessity of a research for increasing a capacity in the massive MIMO system using the two-dimensional planar array antenna has emerged.

Thus, a development of a technique for effectively transmitting a Channel State Information Reference Signal (CSI-RS) for a downlink two-dimensional space (i.e., horizontal and vertical dimensions) channel estimate by using only a limited amount of Resource Elements (REs) and for feeding Channel State Information (CSI) using only a limited feedback is necessary. In addition, a development of a hybrid SM & SDMA technique which optimally selects and performs the SM and the SDMA in the two-dimensional space channel using this is necessary.

DETAILED DESCRIPTION OF THE INVENTION

Technical Problem

An aspect of the present invention is to provide a device and a method for transmitting and receiving data, which effectively transmit a CSI-RS for a downlink two-dimensional space channel estimate, by using a limited amount of downlink resources, even in a massive MIMO transmitter structure using a two-dimensional planar array antenna using a lot of transmission antennas.

Technical Solution

In order to achieve the above-mentioned aspect, a technique for transmitting a limited number of CSI-RSs in a two-dimensional space, which is proposed in the present invention, defines Space Resource Blocks (SRBs) by grouping Space Elements (SEs) of which a spatial correlation between channels in a horizontal dimension is high and SEs of a vertical dimension corresponding to this, and transmits CSI-RSs for a channel estimate in vertical dimension SEs corresponding to one horizontal SE selected in each SRB, every Transmit Time Interval (TTI).

In order to achieve the above-mentioned aspect, a technique for determining the position of a horizontal SE transmitting a CSI-RS in each SRB, which is proposed in the present invention, transmits the CSI-RS at a fixed position, or changes the position every TTI, every time the CSI-RS is transmitted or every time a User Equipment (UE) estimates a channel according to a predetermined random transmission pattern.

In order to achieve the above-mentioned aspect, a technique for determining the optimal SRB size according to each UE, which is proposed in the present invention estimates a spatial correlation between channels of SEs of different horizontal dimensions belonging to the same SRB received from different TTIs and a spatial correlation between channels of SEs of a horizontal dimension belonging to different SRBs received from the same TTI according to each UE, and feeds information for changing the size of an SRB of a corresponding UE to an optimal size back to an eNodeB.

In order to achieve the above-mentioned aspect, a hybrid SM & SDMA technique proposed in the present invention feeds an index of an SRB preferred by each UE, a rank in a vertical dimension of a corresponding SRB and Channel Quality Information (CQI) to an eNodeB, and when ranks of each UE are determined, transmits a maximum full rank in the vertical dimension and a single rank according to each SRB in the horizontal dimension.

More specifically, a method of transmitting and scheduling a reference signal of an eNodeB in a wireless communication system using a two-dimensional planar array antenna of the present invention comprises determining at least one space resource block including space elements of which a spatial correlation between downlink channels in a horizontal dimension is equal to or higher than a predetermined reference value and space elements of a vertical dimension, which corresponds to the space elements, transmitting the reference signal to a User Equipment (UE) through vertical dimension space elements corresponding to one horizontal dimension space element selected in each space resource block, and scheduling data to be transmitted to the UE through each space resource block based on feedback information transmitted from the UE.

In addition, a method of receiving a reference signal and feeding a channel state back of a User Equipment (UE) in a wireless communication system using a two-dimensional planar array antenna of the present invention comprises receiving the reference signal transmitted through vertical dimension space elements corresponding to one horizontal dimension space element selected in a space resource block, from an eNodeB, measuring the channel state using the reference signal, generating feedback information based on the measured channel state, and reporting the generated feedback information to the eNode. The space resource block includes space elements of which a spatial correlation between downlink channels in a horizontal dimension is equal to or higher than a predetermined reference value, and space elements of a vertical dimension, which corresponds to the space elements.

In addition, an eNodeB for transmitting a reference signal and performing a scheduling in a wireless communication system using a two-dimensional planar array antenna of the present invention comprises a transmitting and receiving unit that transmits and receives a signal to and from a User Equipment (UE), and a control unit that controls to determine at least one space resource block including space elements of which a spatial correlation between downlink channels in a horizontal dimension is equal to or higher than a predetermined reference value and space elements of a vertical dimension, which corresponds to the space elements, transmit the reference signal to the UE through vertical dimension space elements corresponding to one horizontal dimension space element selected in each space resource block, and schedule data to be transmitted to the UE through each space resource block based on feedback information transmitted from the UE.

In addition, a User Equipment (UE) for receiving a reference signal and feeding a channel state back in a wireless communication system using a two-dimensional planar array antenna of the present invention comprises a transmitting and receiving unit that transmits and receives a signal to and from an eNodeB, and a control unit that controls to receive the reference signal transmitted through vertical dimension space elements corresponding to one horizontal dimension space element selected in a space resource block, from the eNodeB, measure the channel state using the reference signal, generate feedback information based on the measured channel state, and report the generated feedback information to the eNodeB. The space resource block includes space elements of which a spatial correlation between downlink channels in a horizontal dimension is equal to or higher than a predetermined reference value, and space elements of a vertical dimension, which corresponds to the space elements.

Advantageous Effects

According to the present invention, a hybrid SM & SDMA technique effectively transmits a CSI-RS for a downlink two-dimensional space channel estimate using only a limited amount of downlink resources and optimally selects and performs an SM and an SDMA in the two-dimensional space channel, even in a massive MIMO transmitter structure using a two-dimensional planar array antenna.

In addition, a technique for transmitting a limited number of CSI-RSs in a two-dimensional space, which is proposed in the present invention defines SEs of which a spatial correlation between channels is high as an SRB, transmits the CSI-RSs for a channel estimate in a vertical dimension SEs corresponding to one horizontal SE selected in each SRB, and can innovatively reduce the number of the CSI-RSs to be transmitted for the two-dimensional space channel estimate.

In addition, a technique for changing the position of a horizontal SE transmitting a CSI-RS in each SRB every TTI, and a technique for informing of a form of the SRB used by an eNodeB and the position of the horizontal SE transmitting the CSI-RS in each SRB, to UEs through an RRC signaling, which are proposed in the present invention enables each UE to estimate a channel correlation between horizontal SEs of the same SRB and different SRBs estimated every TTI and to change the size of the SRB to the optimal size suitable for a channel space channel characteristic of each UE.

As described above, a hybrid SM & SDMA technique proposed in the present invention limits each UE such that each UE transmits data in an SM method in which each UE transmits the data up to a maximum full rank in a vertical dimension and each UE transmits only a single rank according to an SRB in a horizontal dimension, and thus maximizes a capacity gain by the SM according to each UE in the vertical dimension and maximizes a capacity gain by the SDMA in which different UEs transmit data according to each SRB in the horizontal dimension.

MODE FOR CARRYING OUT THE INVENTION

The present invention proposes a technique for effectively transmitting a CSI-RS for a downlink two-dimensional space channel and a technique for transmitting a data channel, which optimally selects and performs an SM and an SDMA in the two-dimensional space channel, by using a limited amount of RE, in an FDD massive MIMO system using a two-dimensional planar array antenna.

In the following description, a representative embodiment is proposed to achieve the above-mentioned technical aspect. In addition, other embodiments that may be proposed in the present invention are replaced as the description in the configuration of the present invention.

A. Massive MIMO System Model Using Planer Array Antenna

As a preferable embodiment to which the present invention is effectively applied, a massive MIMO system including MN antenna elements by including M transmission antennas in a horizontal dimension and N transmission antennas in a vertical dimension is considered.

In the above-mentioned planar massive MIMO system, a CSI-RS and data are transmitted by a respective precoding, that is a beamforming, with column vectors of MN*1 size of MN*MN 2D-Discrete Fourier Transform (DFT) precoding matrix U. The column vector $\{u_{m,n}\}_{m=1, \ldots, M, n=1, \ldots, N}$ of the MN*1 size of U forms MN intersected transmission beams in a two-dimensional space, which include M intersected transmission beams in the horizontal dimension and N intersected transmission beams in the vertical dimension.

When it is assumed that a User Equipment (UE) uses one reception antenna, a channel response $h_{k,(m,n)}$ received by a beam positioned at the m-th position in the horizontal dimension and the n-th position in the vertical dimension in a two-dimensional beam space formed by a precoding vector Urn, n is the same as following [Equation 1].

$$\tilde{h}_{k,(m,n)} = h_k u_{m,n}, m=1, \ldots, M, n=1, \ldots, N \quad \text{[Equation 1]}$$

Here, $h_k$ is a 1*MN channel vector from the MN transmission antennas to the reception antenna of the UE. Thus, each UE may estimate the channel response $\{\tilde{h}_{k,(m,n)}\}_{m=1, \ldots, M, n=1, \ldots, N}$ received by the MN intersected transmission beams in the two-dimensional space.

The massive MIMO system using the two-dimensional planar array antenna according to an embodiment of the present invention may use many transmission antennas in the horizontal dimension and may use few transmission antennas in the vertical dimension.

Thus, since a very high beamforming gain may be provided in the horizontal dimension, it has a high directional characteristic in which a signal is transmitted in only a very limited direction. In addition, when M transmission antennas are used in the horizontal dimension, since M beams may uniformly divides 120° horizontal service area of each sector of an eNodeB including three sectors to provide service, a distance between beams may be very short as 120°/M.

Thus, a correlation of a channel response received by adjacent beams in the horizontal dimension, which are beams of which a signal transmission direction is very close becomes very high. For example, when a channel response of which the size is very large is received from (m−1)-th, m-th, (m+1)-th and (m+2)-th beams in the horizontal dimension, channel responses received from vertical dimension beams of m-th and (m+1)-th rows in the horizontal dimension have a very high correlation and received, and thus the channel responses have very similar channel response characteristics. That is, the channel response becomes $\{\tilde{h}_{k,(m,n)}\}_{n=1, \ldots, N} \cong \{\tilde{h}_{k,(m+1,n)}\}_{n=1, \ldots, N}$.

Thus, in the massive MIMO system performing a beamforming on the CSI-RS and transmitting the CSI-RS like the invention, although the CSI-RS is transmitted using vertical dimension beams in one row selected from m-th and (m+1)-th rows of the horizontal dimension, it is possible to simultaneously estimate downlink channel information of vertical beams of the m-th and (m+1)-th rows.

Thus, when the CSI-RS is transmitted by selectively using only a random beam among beams of which a spatial correlation is sufficiently high in the horizontal dimension, the number of CSI-RSs necessary to be transmitted for the downlink channel estimate may be innovatively reduced. In addition, since it has a high spatial correlation between adjacent beams in the horizontal dimension, a rank of a downlink channel matrix formed by a plurality of adjacent beams in the horizontal dimension is close to 1. Therefore, transmitting only one data stream using the plurality of beams of which the spatial correlation is high provides a high capacity compared to simultaneously transmitting a plurality of data streams using the plurality of beams of which the spatial correlation is high. In contrast, since a spatial correlation between the beams in the vertical dimension is sufficiently low, it is possible to simultaneously transmit a plurality of data streams according to the maximum number of antennas of the vertical dimension, which is a maximum rank, using the plurality of beams of the vertical dimension.

Thus, the present invention proposes a method of effectively transmitting the CSI-RS in the horizontal dimension, in the massive MIMO system of the planar array. In addition, the present invention proposes a transmission technique in which a Spatial Multiplexing (SM) and a Space Division Multiple Access (SDMA) are combined, which limits a transmission rank in the horizontal dimension and transmits a maximum transmission rank in the vertical dimension, in the below.

B. Definition of Space Resource Block and Effective CSI-RS Transmission Technique which are Proposed A planer array configured of MN antenna elements by including M transmission antennas in a horizontal dimension and N transmission antennas in a vertical dimension is assumed, for an effective application of the present invention.

Figure 1:
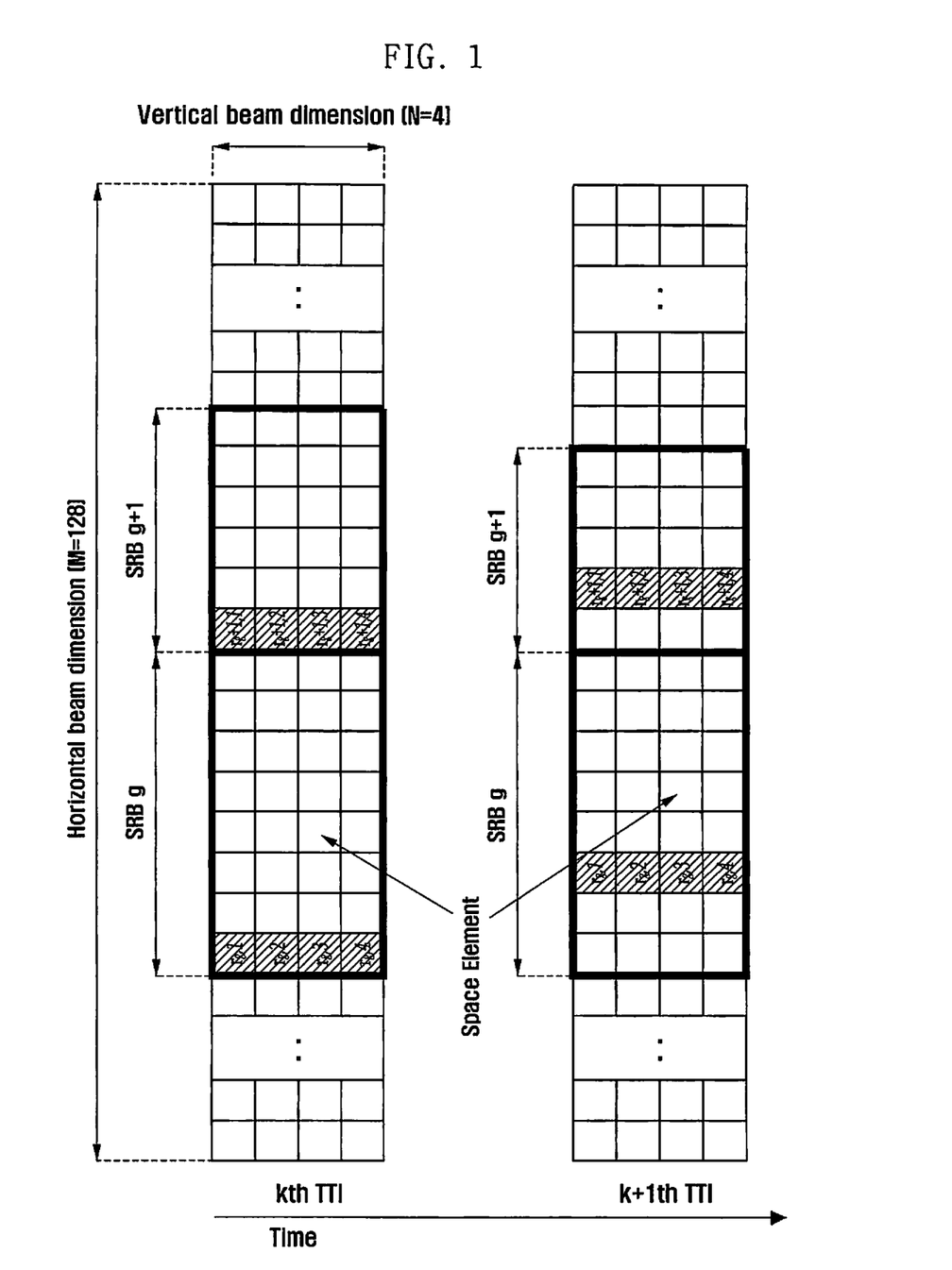
FIG. 1 is a view illustrating concepts of a proposed space resource block and a CSI-RS transmission technique.

FIG. 1 illustrates a concept of a two-dimensional beam space formed of MN intersected transmission resources formed by a 2D-DFT precoding matrix proposed in the present invention, or transmission beams corresponding to the transmission resources, which are Space Elements (SEs), which is a Space Resource Block (SRB) proposed in a grid of a space resource.

The SRB is defined as a group of a plurality of adjacent beams in the horizontal dimension, of which a spatial correlation is sufficiently high (i.e., the spatial correlation is higher than a predetermined reference value) among MN intersected transmission beams in the horizontal dimension, and beams of the vertical dimension corresponding to the plurality of beams of the horizontal dimension.

FIG. 1 illustrates an example wherein g-th SRB is formed of 32 SEs by grouping 8 beams of which a spatial correlation is sufficiently high in the horizontal dimension including 128 beams and 4 beams in the vertical dimension, which correspond to the 8 beams. Since a downlink channel characteristic of the horizontal beams belongs to each SRB is very similar, the CSI-RS is transmitted from one horizontal beam selected in each SRB and vertical dimension beams thereof, and thus a channel estimate by all beams belongs to the corresponding SRB is possible.

FIG. 1 illustrates an example wherein CSI-RSs $r_{g,1}$, $r_{g,2}$, $r_{g,3}$ and $r_{g,4}$ are transmitted through 4 vertical beams of a first horizontal dimension beam of g-th SRB.

The size (the number of the horizontal dimension beams belongs to the SRB) of the horizontal dimension of the SRB is proportional to an Angular Spread (AS) of a downlink channel environment to the UE transmitting data through a corresponding SRB. Since the AS is small in a Light Of Sight (LOS) environment, the size of the horizontal dimension of the SRB should be sufficiently small, and the larger the AS of the channel environment, the larger the size of the horizontal dimension of the SRB should be. Thus, since the horizontal dimension size of each SRB is changed according to the position and the channel environment in the horizontal dimension of each SRB, the size of the SRB should have non-uniform distribution and should be adaptively changed.

Thus, the form and the number of the SRBs used by the eNodeB may be changed every TTI, every time when the CSR-RS is transmitted, or every time when the UE estimates a channel. This can be identified through FIG. 1. FIG. 1 shows an example wherein g-th SRB in k-th TTI includes 32 SEs using 8 horizontal beams, in contrast, (g+1)-th SRB includes 24 SEs using 6 horizontal beams, and thus the size of the SRB has a non-uniform distribution.

In addition, FIG. 1 shows an example wherein the (g+1)-th SRB includes 24 SEs using 6 horizontal beams in the k-th TTI, in contrast, the (g+1)-th SRB includes 20 SEs using 5 horizontal beams in the (k+1)-th TTI, and thus the size of the SRB may be changed every TTI.

The eNodeB selects one beam among horizontal beams included in each SRB, and transmits the CSI-RS through vertical beams of a corresponding beam. The eNodeB transmits the CSI-RS using different horizontal beams in each SRB every TTI or a TTI of a regular period.

Patterns for selecting the horizontal beams which transmit the CSI-RS, in each SRB may be different. More specifically, FIG. 1 shows an example wherein the g-th SRB transmits the CSI-RS using a first horizontal beam in the k-th TTI, and transmits the CSI-RS using a third horizontal beam in the next (k+1)-th TTI. In contrast, the (g+1)-th SRB transmits the CSI-RS using the first horizontal beam in the k-th TTI, and transmits the CSI-RS using a second horizontal beam in the next (k+1)-th TTI, and thus FIG. 1 shows an example of different transmission patterns. Thus, the size of the SRB used by the eNodeB and the positions of the SEs transmitting the CSI-RS in each SRB may be changed every TTI.

Figure 2:
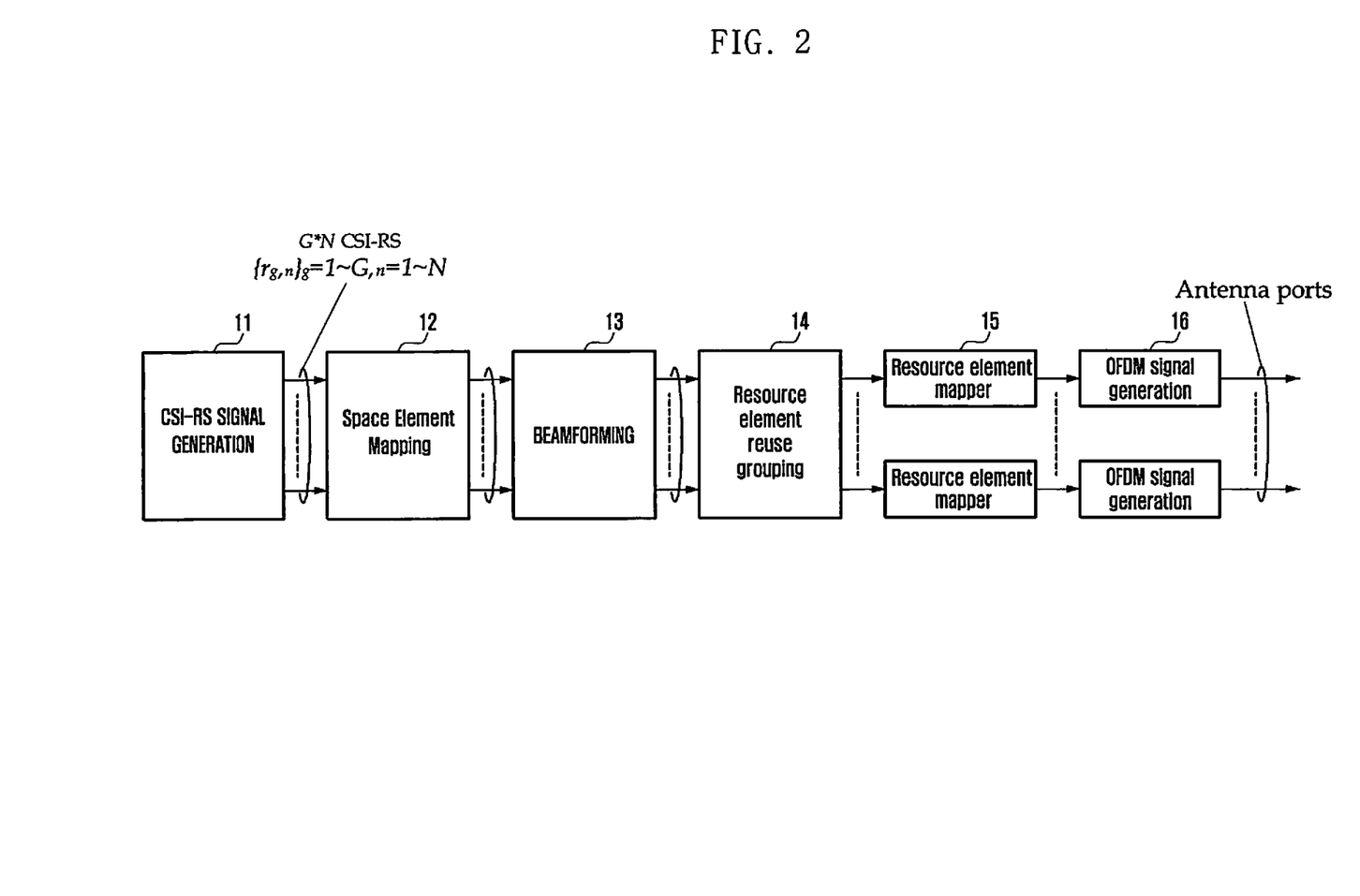
FIG. 2 is a view illustrating an outline of a physical channel processing performed for a CSI-RS transmission of the proposed CSI-RS transmission technique.

FIG. 2 illustrates an outline of a physical channel processing in the eNodeB, which is performed for a CSI-RS transmission of an effective CSI-RS transmission technique for the massive MIMO system using the proposed planar array.

In a reference numeral 11 of FIG. 2, G*N CSI-RSs $\{r_{g,1} \sim r_{g,N}\}_{g=1 \sim G}$ are generated. Here, G denotes the number of the used SRBs, and N denotes a vertical dimension of a corresponding SRB. N CSI-RSs $r_{g,1} \sim r_{g,n}$ are generated in each SRB.

In a reference numeral 12 of FIG. 2, the generated CSI-RSs $\{r_{g,1} \sim r_{g,N}\}_{g=1 \sim G}$ are mapped to corresponding SEs suitably to the SRB size of a corresponding TTI and transmission patterns of each SRB. This is because the form of the SRB used by the eNodeB and the positions of the SEs transmitting in each SRB may be changed every TTI or every transmission time.

In a reference numeral 13 of FIG. 2, a beamforming is performed on the corresponding CSI-RS using weighted vectors of the SEs to which the CSI-RSs $\{r_{g,1} \sim r_{g,N}\}_{g=1 \sim G}$ are mapped. The CSI-RS $r_{g,n}$ to be transmitted through an n-th vertical beam of a g-th SRB is multiplied to a weighted value $u_{x_g,n}$ of the n-th vertical beam of $x_g$-th horizontal beam to be used by the g-th SRB in the corresponding TTI, and thus a symbol to be transmitted to MN antenna ports is generated.

In a reference numeral 14 of FIG. 2, CSI-RSs which may reuse or share one Resource Element (RE) defined in frequency and time domains in a resource grid of an LTE are divided into a plurality of groups. Since a very high beamforming gain is provided in the massive MIMO horizontal dimension, it has a high directional characteristic in which a signal is transmitted in only a very limited direction. Thus, although the same RE is allocated to CSI-RSs transmitted by beams of which transmission signal directions are sufficiently far in the horizontal dimension, interference between the CSI-RSs sharing the same RE is very limited by the high directional characteristic of the beams. The number of the REs required to transmit the G*N CSI-RS through the above-mentioned RE reusing may be reduced according to a level of the reusing. For example, in FIG. 1, the N CSI-RSs $\{r_{g,n}\}_{n=1 \sim N}$ to be transmitted by the g-th SRB and the N CSI-RSs $\{r_{g,n}\}_{n=1 \sim N}$ to be transmitted by a (g+3)-th SRB of which the signal transmission direction is far from that of the g-th SRB in the horizontal dimension may be transmitted using the same RE. Thus, SRBs transmitting the CSI-RS using the same RE among all SRBs are divided into an RE reusing group and transmit the CSI-RS.

In a reference numeral 15 of FIG. 2, the RE is mapped according to each reusing group designated in the reference numeral 14.

In a reference numeral 16 of FIG. 2, each OFDM signal is generated and is transmitted according to each antenna port.

C. Proposed Hybrid Spatial Multiplexing and Space Division Multiple Access Technique FIG. 3 illustrates a flowchart of an overall operation performed by the UE and the eNodeB for the proposed SM & SDMA technique.

The UEs receive information on the number of the SRBs and the sizes of each SRB through a high rank signaling from the eNodeB of a cell belong thereto.

Figure 3:
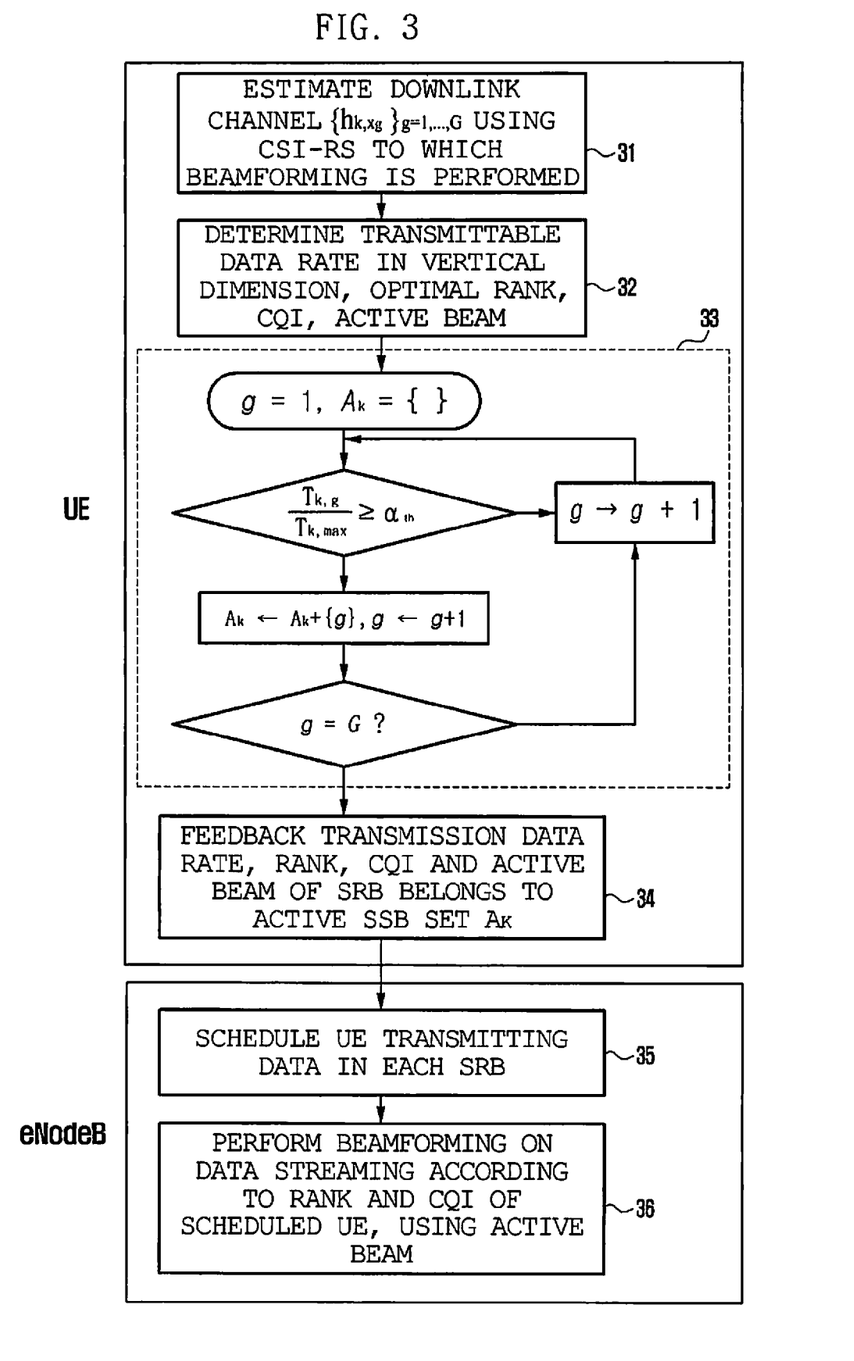
FIG. 3 is a view illustrating an overall operation flow performed by a User Equipment (UE) and an eNodeB for the proposed hybrid SM & SDMA technique.

Next, in step 31 of FIG. 3, the UE estimates G*N CSI-RS symbols, and estimates the estimated G*N channel coefficients as a group of N channel coefficients of the vertical dimension of each SRB, based on SRB number information transferred from the eNodeB. Therefore, a channel vector $\tilde{h}_{k,x_g} = [\tilde{h}_{k,(x_g,1)} \; \tilde{h}_{k,(x_g,2)} \; \cdots \; \tilde{h}_{k,(x_g,N)}]$ configured of a channel coefficient $\{\tilde{h}_{k,(x_g,n)}\}_{n=1,\ldots,N}$ received to each UE by a beamforming by a weighted vector $\{u_{x_g,n}\}_{n=1,\ldots,N}$ of N vertical beams of the $x_g$-th horizontal beam of each SRB with respect to G SRBs is estimated.

To this end, since the form (i.e., the number G of the SRBs) of the SRB may be changed every TTI, every transmission period, or every channel estimate time of the UE, the eNodeB should transfer information on the form of the SRB, that is, information on the number of the SRBs to the UEs therein, through a downlink Radio Resource Control (RRC) signaling channel.

In step 32 of FIG. 3, each UE determines a transmittable maximum data rate in the vertical dimension, an optimal rank (i.e., the simultaneously transmittable data stream number), Channel Quality Information (CQI) of each data stream, and active beams of the vertical dimension to be used in a data transmission.

As shown in [Equation 2], a k-th UE calculates result values of a random function $f(\cdot)$ of which an input is a channel vector $\{\tilde{h}_{k,x_g}\}_{g=1,\ldots,G}$ of each SRB. Here, the random function $f(\cdot)$ calculates a transmittable maximum data rate $T_{k,g}$ (or reception possible Signal-to-Noise and Interference Ratio (SINR)), optimal rank information $RI_{k,g}$ (i.e., simultaneously transmittable data stream number), Channel Quality Information (CQI) $\{CQI_{k,(g,i)}\}_{i=1,\ldots,RI_g}$ of the $RI_{k,g}$ data streams, and active beam index information of the vertical dimension to be used in the data transmission.

$$(T_{k,g}, RI_{k,g}, \{CQI_{k,(g,i)}\}_{i=1,\ldots,RI_g}, B_{k,g}) = f(\tilde{h}_{k,x_g}) \quad \text{[Equation 2]}$$

In order that the k-th UE calculates the transmittable maximum data rate $T_{k,g}$, the optimal rank information $RI_{k,g}$, the CQI $\{CQI_{k,(g,i)}\}_{i=1,\ldots,RI_{k,g}}$, and the active beam index information $B_{k,g}$, the corresponding UE should know an amount of transmission power allocated thereto from the eNodeB.

To this end, in the present invention, the UE infers the amount of the transmission power allocated to the corresponding UE from the eNodeB based on the number information of the SRBs transferred from the eNodeB through the high rank signaling, under an assumption that total transmission power of the eNodeB is equally divided and allocated to all SRBs.

In step 33 of FIG. 3, as shown in [Equation 3], the k-th UE selects indexes of SRBs, which are equal to or larger than $\alpha_{th}$ times of a fixed value of a maximum value $T_{k,max}$ among the transmittable maximum data rate $\{T_{k,g}\}_{g=1,\ldots,G}$ calculated according to each SRB in step 32, and subsumes the indexes under an active SRB index set $A_k$. Here, $\alpha_{th}$ is a parameter for determining the active SRB index.

$$g \in A_k, \text{ if } \frac{T_{k,g}}{T_{k,max}} \geq \alpha_{th} \text{ for } g = 1, \ldots, G \quad \text{[Equation 3]}$$

In step 34 of FIG. 3, the k-th UE feeds the transmittable maximum data rate, the optimal rank information, the CQI and the active beam index information of the SRB belongs to the active SRB index set $A_k$ determined in step 33, that is $\{T_{k,g}, RI_{k,g}, \{CQI_{k,(g,i)}\}_{i=1,\ldots,RI_{k,g}}, B_{k,g}\}_{g \in A}$ to the eNode B.

In step 35 of FIG. 3, a scheduler of the eNodeB schedules the UE transmitting the data according to each SRB, using the active SRB index information and the CQI of each active SRB which are fed back from each UE through step 34.

A UE $\{k^*_g\}_{g=1,\ldots,G}$ maximizing a scheduling priority function $F(T_{k,g})$ may be selected, aimed at UEs which subsume a corresponding SRB to the active SRB index set $A_k$, and a selection by another method is included in the present invention.

$$k^*_g = \underset{k, g \in A_k}{\operatorname{argmax}} F(T_{k,g}) \text{ for } g = 1, \ldots, G \quad \text{[Equation 4]}$$

In step 36 of FIG. 3, the eNodeB configures data streams as many as the optimal rank number using a Modulation and Coding Scheme (MCS) suitable for a corresponding CQI, using the optimal rank information and the CQI of a corresponding UE, to the UEs $\{k^*_g\}_{g=1,\ldots,G}$ scheduled according to each SRB.

In addition, the eNodeB performs the beamforming and transmits using a weighted value of the vertical dimension beams belong to the horizontal beam $B_{k^*_g,g}$ used by the corresponding SRB, based on the active beam index set $B_{k^*_g,g}$ of the corresponding UE, to the scheduled UEs $\{k^*_g\}_{g=1,\ldots,G}$.

According to an embodiment of the present invention, when each UE calculates the transmittable optimal rank $RI_{k,g}$ by the vertical dimension channel vector $\tilde{h}_{k,x_g}$ of the g-th SRB as shown in equation 2, the transmittable maximum rank is not limited. That is, the number of the data streams that may be simultaneously transmitted may be up to the number of antennas of the vertical dimension or the number of the beams. This is because a Spatial Multiplexing (SM) technique of a high rank, which simultaneously transmits a plurality of data streams to one UE in the vertical dimension, may be optimally operated since a spatial correlation of a downlink channel to each UE in the vertical dimension of the 2D massive MIMO system is low.

In contrast, since the spatial correlation of the downlink channel to each UE in the horizontal dimension in the 2D massive MIMO system is very high, data streams of a low rank are allocated to a plurality of UEs in the horizontal dimension, and thus a system capacity increase by the Space Division Multiple Access (SDMA) wherein many UEs divides beams of the horizontal dimension and transmit data may be maximized. To this end, the parameter $\alpha_{th}$ necessary to determine the optimal active SRB index or the size (i.e., the number of SRB indexes which may be included in the set) of the active beam index set $A_k$, which control the transmittable rank in the horizontal dimension of each UE should be limited such that the transmittable maximum rank number of each UE becomes 1 or 2. Thus, in order to determine information on the parameter $\alpha_{th}$ necessary to determine the optimal active SRB index or the size of the active beam index set $A_k$, and to share the information with all UEs included in the cell of the eNodeB, the information on the $\alpha_{th}$ or the size of the active SRB index set are appointed through a standard in advance, or the eNodeB transfers the information on the $\alpha_{th}$ or the size of the active SRB index set to all UEs through the downlink Radio Resource Control (RRC) signaling.

D. Downlink Radio Resource Control (RRC) Signaling Technique for Transferring Information on Space Resource Block and Position of Transmission Horizontal Beam of Each SRB The size (the number of the horizontal dimension beams belongs to the SRB) of the horizontal dimension of each SRB is proportional to an Angular Spread (AS) of a downlink channel environment to the UE transmitting data through a corresponding SRB. Since the AS is small in a light of sight environment, the size of the horizontal dimension of the SRB should be sufficiently small, and the larger the AS of the channel environment, the larger the size of the horizontal dimension of the SRB should be. Thus, since the horizontal dimension size of each SRB is changed according to the position and the channel environment in the horizontal dimension of each SRB, the size of the SRB may have non-uniform distribution and should be adaptively changed.

Thus, as shown in FIG. 1, each UE may estimate a spatial correlation between downlink channels transmitted by a beams of the horizontal dimensions belong to different SRBs in the same TTI, and estimates a spatial correlation between the downlink channels transmitted by beams of different horizontal dimensions in the same SRB in different TTIs. When the estimated spatial correlation between the downlink channels by the beams of the horizontal dimensions belong to the different SRBs in the same TTI is equal to or higher than a reference value, information for requesting an expansion of the size of the current SRB fed back to the eNodeB. In addition, the spatial correlation between the downlink channels transmitted by the beams of the different horizontal dimensions in the same SRB in different TTIs is equal to or lower than the reference value, a corresponding UE feeds information for requesting an exclusion of a corresponding beam from the current SRB, which is information for requesting a reduction of the size of the current SRB back to the eNodeB. Accordingly, the eNodeB may determine forms of the all SRBs and may transmit the CSI-RS using this, by reflecting the optimal size of the SRB suitable for the channel environments of each UE.

In order that each UE performs the above-mentioned SRB optimization process, each UE should know the forms of the SRBs used by the eNodeB and the positions of the horizontal beams transmitted in each SRB every TTI or every channel estimate time. To this end, the eNodeB may transfer information on the forms of the SRBs used by the eNodeB and the positions of the horizontal beams transmitted from each SRB to all UEs through the downlink Radio Resource Control (RRC) signaling.

E. eNodeB and UE Structures

Figure 4:
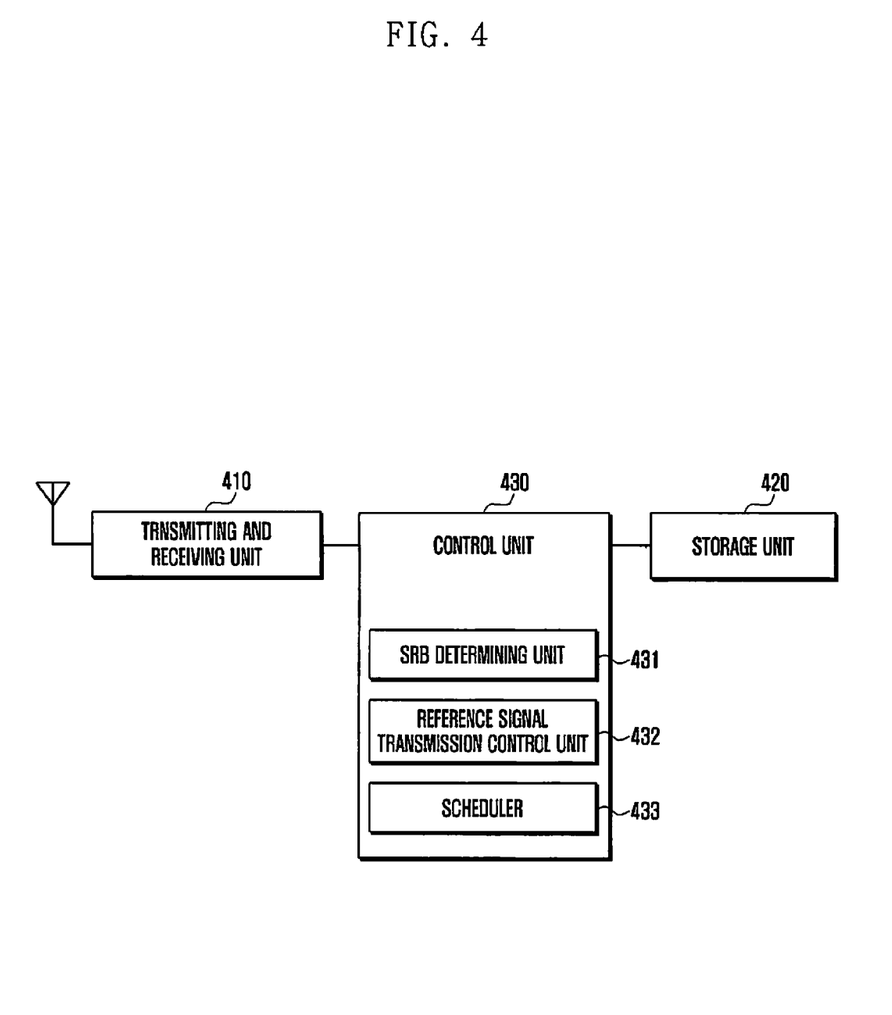
FIG. 4 is a block diagram illustrating an internal structure of an eNodeB according to an embodiment of the present invention.

FIG. 4 is a block diagram illustrating an internal structure of an eNodeB according to an embodiment of the present invention. As shown in FIG. 4, the eNodeB of the present invention may include a transmitting and receiving unit 410, a storage unit 420, and a control unit 430.

The transmitting and receiving unit 410 transmits and receives a signal to and from a UE. The signal transmitted and received to and from the UE may include a control signal, data for a high rank signaling or scheduling information, and the like.

The storage unit 420 stores various programs necessary in an operation of the eNodeB.

The control unit 430 controls signal flows between each block to enable the eNodeB to transmit a reference signal and to schedule data for the UE, according to an embodiment of the present invention. To this end, the control unit 430 may further include an SRB determining unit 431, a reference signal transmission control unit 432 and a scheduler 433.

The SRB determining unit 431 determines at least one space resource block including space elements of which a spatial correlation between downlink channels in a horizontal dimension is equal to or higher than a predetermined reference value, and space elements of a vertical dimension, which corresponds to the space elements.

The reference signal transmission control unit 432 controls to transmit a reference signal through the vertical dimension space elements corresponding to one horizontal dimension space element selected from each space resource block.

The scheduler 433 schedules data to be transmitted to the UE through each space resource block based on feedback information transmitted from the UE.

In this case, the sizes and the numbers of the space resource blocks may be changed every TTI, every reference signal transmission time, and every channel estimate time of the UE.

Meanwhile, the control unit 430 may transmit the information on the determined number of the space resource block and the sizes of each space resource block to the UE. In this case, the control unit 430 may transmit the information to the UE through a high rank layer signaling.

Figure 5:
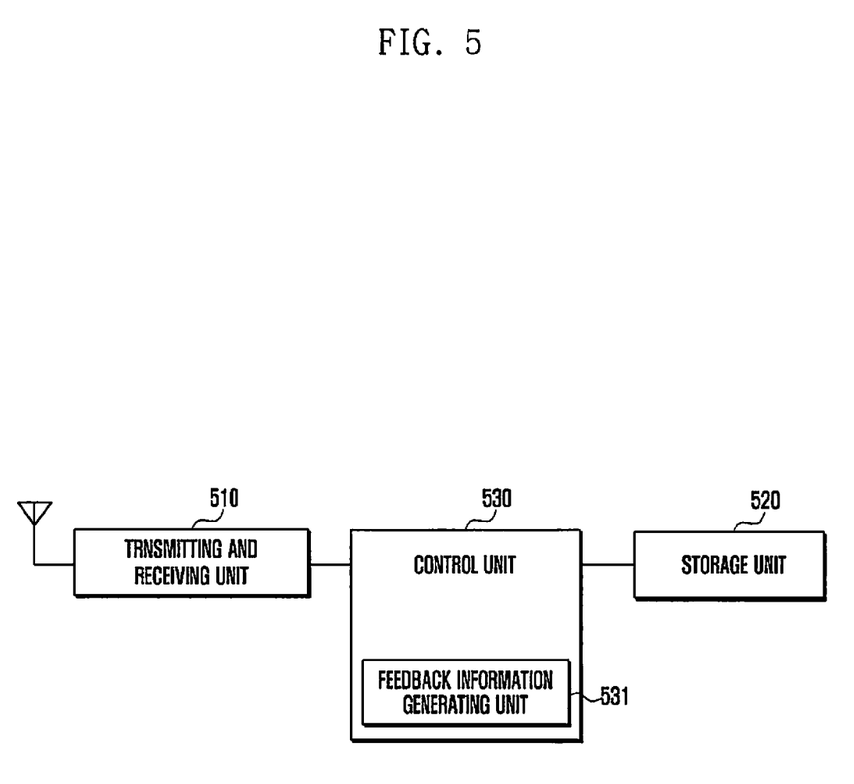
FIG. 5 is a block diagram illustrating an internal structure of a UE according to an embodiment of the present invention.

FIG. 5 is a block diagram illustrating an internal structure of a UE according to an embodiment of the present invention. As shown in FIG. 5, the UE of the present invention may include a transmitting and receiving unit 510, a storage unit 520 and a control unit 530.

The transmitting and receiving unit 510 transmits and receives a signal to and from an eNodeB. The signal transmitted and received to and from the eNodeB may include a control signal, data for a high rank signaling or scheduling information, and the like.

The storage unit 520 stores various programs necessary in an operation of the UE.

The control unit 430 controls sequential processes in which the UE receives a reference signal, measures a channel based on the received reference signal, and reports, to the eNodeB, feedback information including a result of the channel measurement. To this end, the control unit 530 may further include a feedback information generating unit 531.

The feedback information generating unit 531 measures a channel state based on the reference signal transmitted through vertical dimension space elements corresponding to one horizontal dimension space element selected from a space resource block. In addition, the feedback information generating unit 531 generates the feedback information based on the measured channel state, and reports the generated feedback information to the eNodeB.

In this case, the feedback information may include at least one of a space resource block index which is preferred by the UE, a rank of a horizontal plane of the preferred space resource block, and channel quality information. In addition, the rank may be configured up to a maximum rank supported by the UE in the vertical dimension, and the rank may be configured to only a single rank in the horizontal dimension.

Meanwhile, in the above, the eNodeB or the UE includes the control unit, and each control unit includes each functional block performing a detailed function, but present invention is not limited thereto. For example, the function performed by the SRS determining unit 431 of the eNodeB may be performed by the control unit 430.

The invention claimed is:

1. A method for transmitting a reference signal of a base station in a wireless communication system, the method comprising:
    determining at least one space resource block (SRB) comprising a plurality of space elements each of which corresponds to a beam of a first dimension and a beam of a second dimension, wherein a correlation between beams of the first dimension is higher than a threshold in a SRB;
    identifying, for each SRB of the at least one SRB, a space element of the first dimension among a plurality of space elements of the first dimension included in each SRB and a space element of the second dimension corresponding to the identified space element of the first dimension;
    identifying a beam of the first dimension and a beam of the second dimension based on the identified space element of the first dimension and the identified space element of the second dimension; and
    transmitting, to a user equipment (UE), a reference signal mapped to a resource element using the identified beam of the first dimension and the identified beam of the second dimension.

2. The method of claim 1, wherein a size and a number of each SRB of the at least one SRB are changeable by at least one of a transmit time interval, a time that the reference signal is transmitted, and a time that the UE estimates a channel.

3. The method of claim 1, further comprising:
    transmitting, to the UE, information on a number of the at least one SRB and a size of each SRB of the at least one SRB, after the determining the at least one SRB.

4. The method of claim 1, wherein the transmitting the reference signal comprises transmitting the reference signal by selecting an arbitrary space element of the first dimension among the plurality of space elements of the first dimension in the SRB.

5. The method of claim 1, wherein the method further comprises receiving feedback information from the UE,
    wherein the feedback information includes a space resource block index preferred by the UE, a rank of the second dimension of the preferred space resource block, and channel quality information.

6. The method of claim 5, wherein the rank is configured up to a maximum rank supported by the UE in the second dimension, and the rank is configured to only a single rank in the first dimension.

7. A method for receiving a reference signal of a User Equipment (UE) in a wireless communication system, the method comprising:
    receiving, from a base station, a reference signal;
    generating feedback information based on the reference signal; and
    transmitting, to the base station, the generated feedback information,
    wherein the reference signal is transmitted from the base station using an identified beam of a first dimension and an identified beam of the second dimension,
    wherein the identified beam of the first dimension and the identified beam of the second dimension are identified by selecting a space element of the first dimension among a plurality of space elements included in a space resource block (SRB) and a space element of the second dimension corresponding to the selected space element of the first dimension, and wherein a correlation between beams of the first dimension is higher than a threshold in the SRB.

8. The method of claim 7, wherein a size and a number of a plurality of SRBs are changeable by at least one of a transmit time interval, a time that the reference signal is transmitted, and a time that the UE estimates a channel.

9. The method of claim 7, further comprising:
receiving, from the base station, information on a number of the plurality of SRBs and a size of each of the SRBs.

10. The method of claim 7, wherein an arbitrary space element of the first dimension among a plurality of space elements of the first dimension is selected in the SRB by the base station.

11. The method of claim 7, wherein the generating comprises generating the feedback information including a space resource block index preferred by the UE, a rank of the second dimension of the preferred space resource block, and channel quality information.

12. The method of claim 11, wherein the rank is configured up to a maximum rank supported by the UE in the second dimension, and the rank is configured to only a single rank in the first dimension.

13. A base station for transmitting a reference signal in a wireless communication system, the base station comprising:
a transceiver configured to transmit and receive a signal; and
a controller coupled with the transceiver and configured to:
determine at least one space resource block (SRB) comprising a plurality of space elements each of which corresponds to a beam of a first dimension and a beam of a second dimension, wherein a correlation between beams of the first dimension is higher than a threshold in a SRB,
identify, for each SRB of the at least one SRB, a space element of the first dimension among a plurality of space elements of the first dimension included in each SRB and a space element of the second dimension corresponding to the identified space element of the first dimension,
identify a beam of the first dimension and a beam of the second dimension based on the identified space element of the first dimension and the identified space element of the second dimension, and
control the transceiver to transmit, to a user equipment (UE), a reference signal mapped to a resource element using the identified beam of the first dimension and the identified beam of the second dimension.

14. The base station of claim 13, wherein a size and a number of each SRB of the at least one SRB are changeable by at least one of a transmit time interval, a time that the reference signal is transmitted, and a time that the UE estimates a channel.

15. The base station of claim 13, wherein the controller is further configured to control the transceiver to transmit, to the UE, information on a number of the at least one SRB and a size of each SRB of the at least one SRB, after determining the at least one SRB.

16. The base station of claim 13, wherein the controller is further configured to control the transceiver to transmit the reference signal by selecting an arbitrary space element of the first dimension among the plurality of space elements of the first dimension in the SRB.

17. The base station of claim 13, wherein the controller is further configure to control the transceiver to receive feedback information from the UE,
wherein the feedback information includes a space resource block index preferred by the UE, a rank of the second dimension of the preferred space resource block, and channel quality information.

18. The base station of claim 17, wherein the rank is configured up to a maximum rank supported by the UE in the second dimension, and the rank is configured to only a single rank in the first dimension.

19. A User Equipment (UE) for receiving a reference signal in a wireless communication system, the UE comprising:
a transceiver configured to transmit and receive a signal; and
a controller coupled with the transceiver and configured to:
control the transceiver to receive, from a base station, a reference signal,
generate feedback information based on the reference signal, and
control the transceiver to transmit, to the base station, the generated feedback information,
wherein the reference signal is transmitted from the base station using an identified beam of a first dimension and an identified beam of the second dimension.
wherein the identified beam of the first dimension and the identified beam of the second dimension are identified by selecting a space element of the first dimension among a plurality of space elements included in a space resource block (SRB) and a space element of the second dimension corresponding to the selected space element of the first dimension, and
wherein a correlation between beams of the first dimension is higher than a threshold in the SRB.

20. The UE of claim 19, wherein a size and a number of a plurality of SRBs are changeable by at least one of a transmit time interval, a time that the reference signal is transmitted, and a time that the UE estimates a channel.

21. The UE of claim 19, wherein the controller is further configured to control the transceiver to receive, from the base station, information on a number of the plurality of SRBs and a size of each of the SRBs.

22. The UE of claim 19, wherein an arbitrary space element of the first dimension among a plurality of space elements of the first dimension is selected in the SRB by the base station.

23. The UE of claim 19, wherein the controller is configured to control to generate the feedback information including a space resource block index preferred by the UE, a rank of the second dimension of the preferred space resource block, and channel quality information.

24. The UE of claim 23, wherein the rank is configured up to a maximum rank supported by the UE in the second dimension, and the rank is configured to only a single rank in the first dimension.

* * * * *